Sept. 30, 1930.   C. C. CROCKETT   1,777,197
PORTABLE CABLE REEL
Original Filed Aug. 24, 1928   3 Sheets-Sheet 1
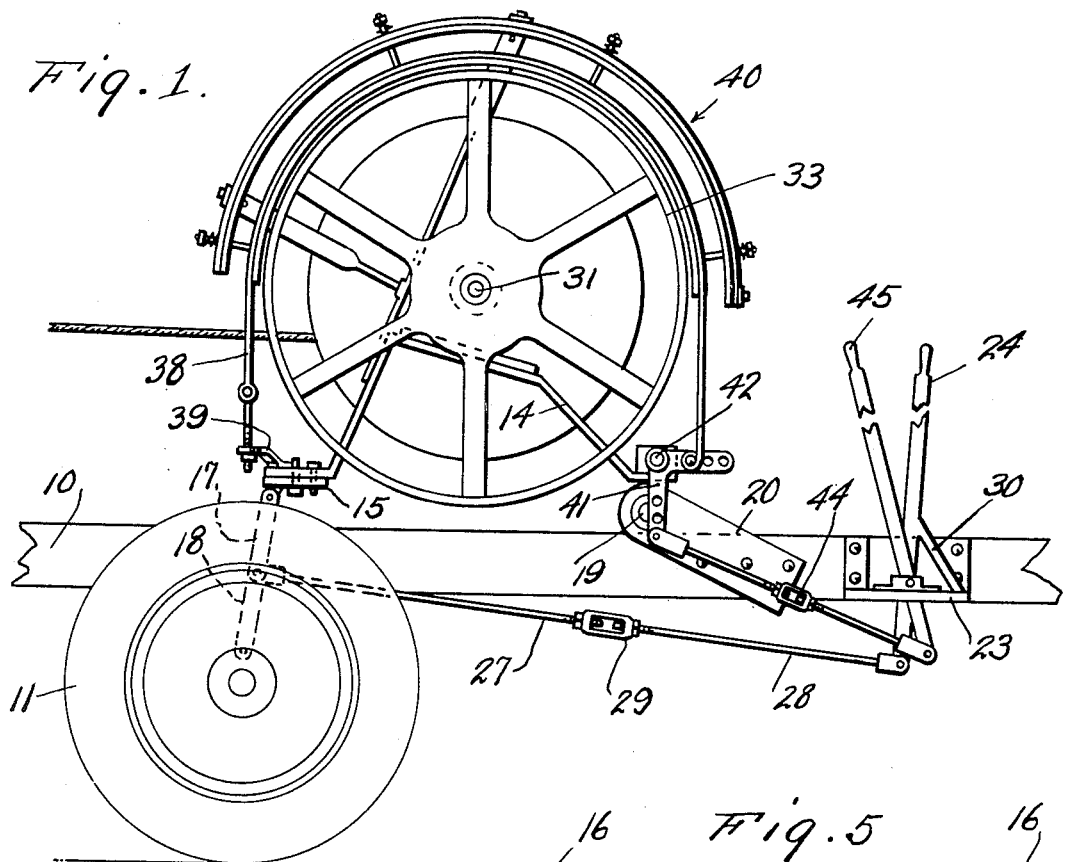
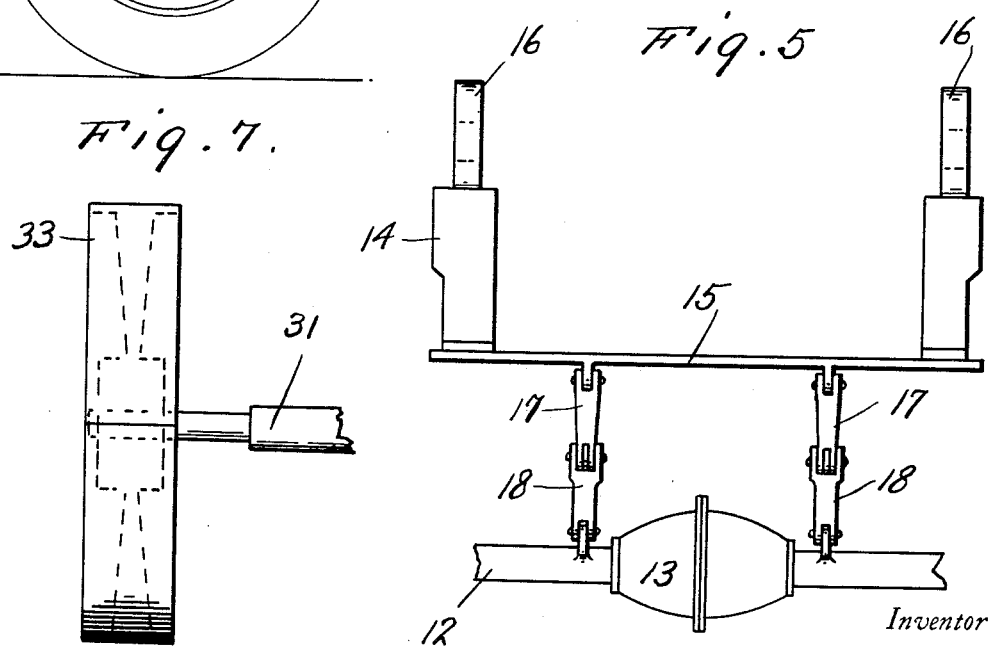
Inventor
C. C. Crockett
By Clarence A O'Brien
Attorney Sept. 30, 1930.  C. C. CROCKETT  1,777,197
PORTABLE CABLE REEL
Original Filed Aug. 24, 1928   3 Sheets-Sheet 2
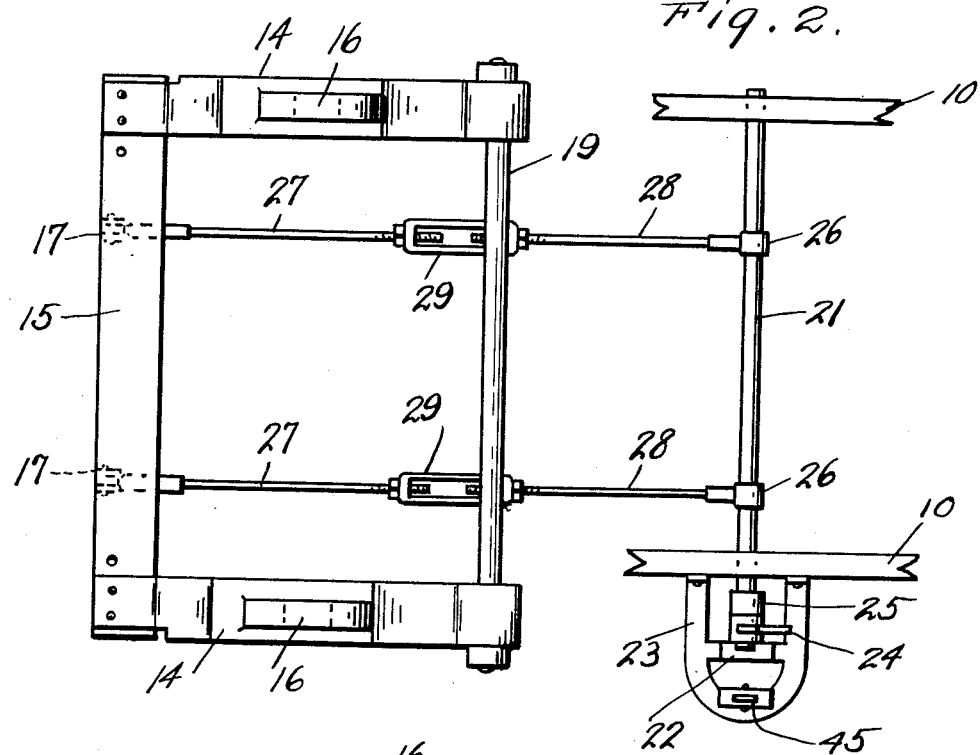
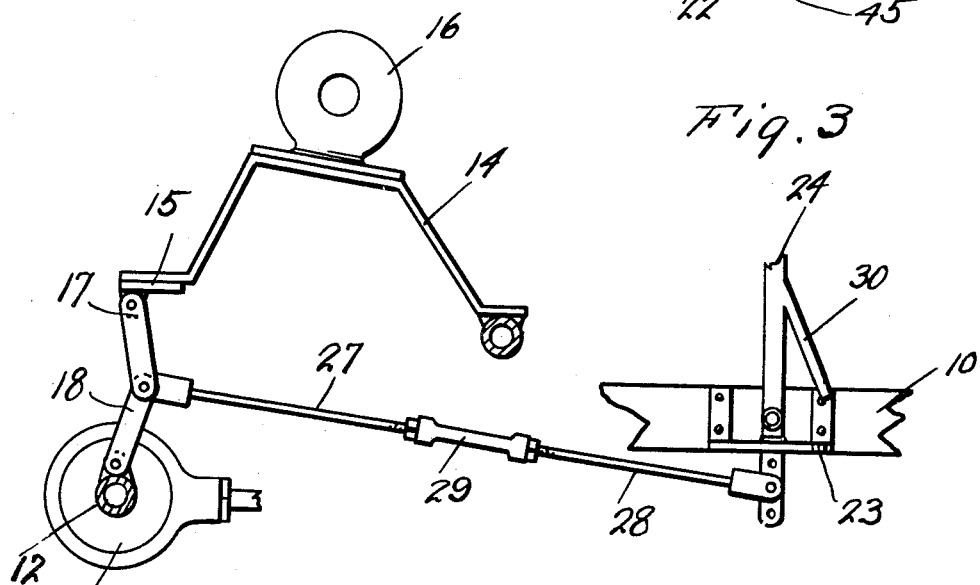
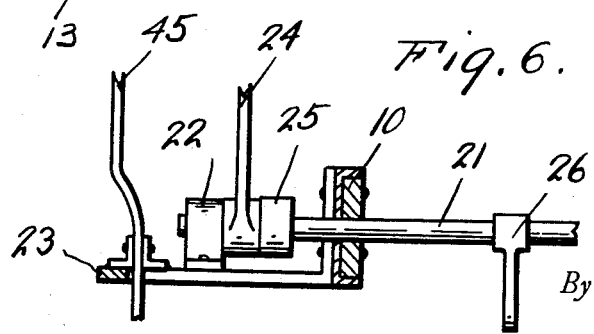
Inventor
C. C. Crockett
By Clarence A. O'Brien
Attorney Sept. 30, 1930.  C. C. CROCKETT  1,777,197
PORTABLE CABLE REEL
Original Filed Aug. 24, 1928  3 Sheets-Sheet 3
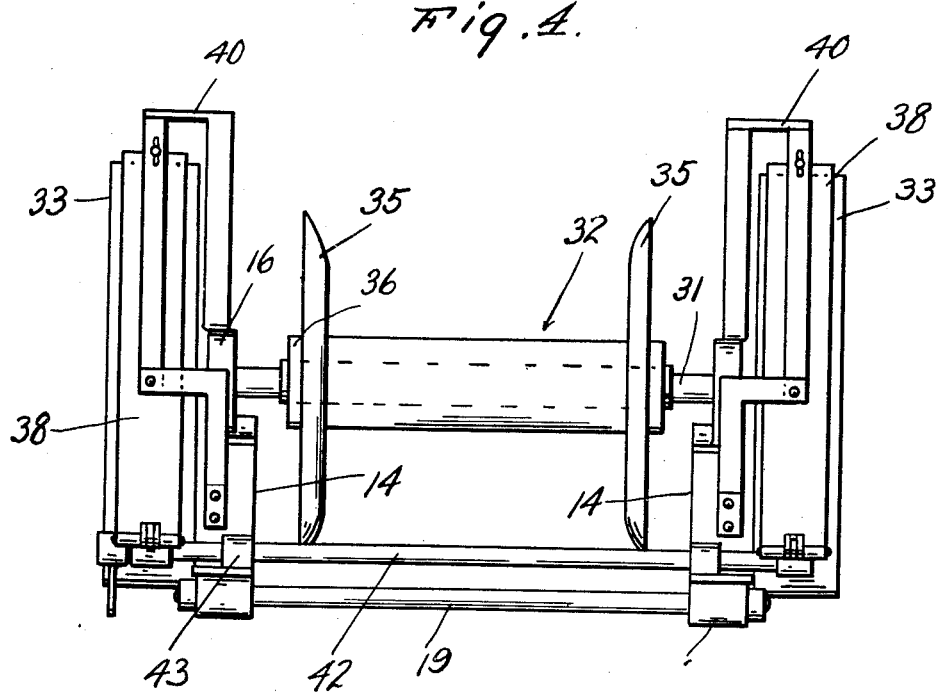
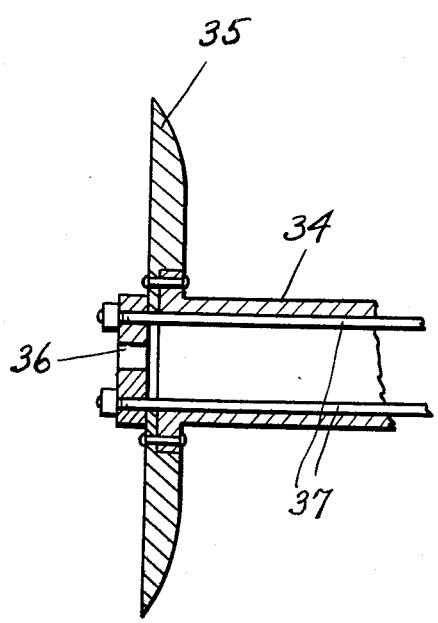
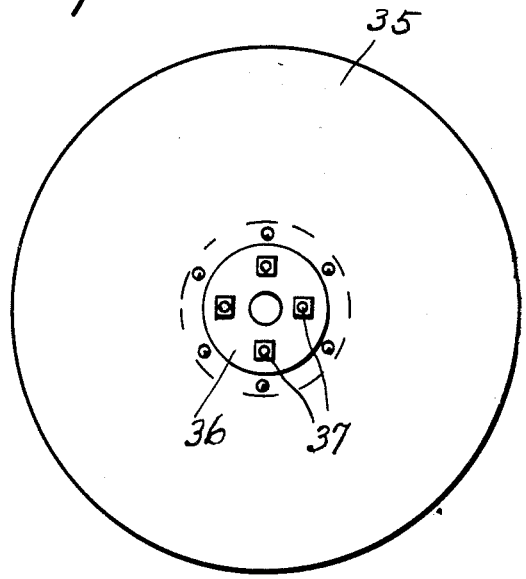
Inventor
C. C. Crockett
By *Clarence A. O'Brien*
Attorney Patented Sept. 30, 1930

1,777,197

UNITED STATES PATENT OFFICE

CHARLES CLIFFORD CROCKETT, OF DRUMRIGHT, OKLAHOMA

PORTABLE CABLE REEL

Application filed August 24, 1928, Serial No. 301,916. Renewed April 23, 1930.

This invention relates to an improved portable cable reel structure designed principally for use in oil well fields for reeling and unreeling cables, wires, and the like, whereby to permit the convenient stretching of wire, or reeling of a cable for extracting tools, rods, and other equipment from wells.

The invention has more particular reference to a reel structure which is constructed to be mounted on a suitable automobile or truck chassis, the arrangement being such that the reel is permitted to receive rotary power from the rear wheel of an automobile, when said wheels are jacked up.

Briefly, the invention embodies a swingably mounted frame, mounted on the vehicle chassis, this frame carrying the winding reel and friction driven pulley, the arrangement being such that the pulleys can be moved into and out of frictional contact with the vehicle wheels through the medium of a system of levers and operating devices to be manually controlled by an operator.

The principal object is to produce a structure of this type which is characterized by compactness and convenience of arrangement of parts, so organized and cooperating as to provide a structure which can be conveniently manipulated, and which will fulfill the requirements of a reel of this class, equally as well as the more expensive and complicated reel structures known to me.

Other features and advantages and objects will become more readily apparent from the following description and drawings.

In the drawings:

Figure 1 is a side view of a portion of the vehicle frame and supporting wheel, with the improved reel structure associated therewith.

Figure 2 is a top plan view of the reel supporting frame, and operating means therefor.

Figure 3 is a side elevational view of Figure 2.

Figure 4 is an end view of the frame and reels mounted thereon.

Figure 5 is a rear elevational view of the frame structure showing the manner in which it is connected with the rear axle housing of the vehicle.

Figure 6 is a detail view of the operating lever and the rock shaft associated with one of said levers.

Figure 7 is an end elevational view of one end of the rotary wheel structure showing the sectional friction drive pulley or wheel.

Figure 8 is a sectional view of one end portion of the reel per se.

Figure 9 is an end view of Figure 8.

Referring now to the drawings by reference numerals, it will be observed that the vehicle chassis frame is generally designated by the reference character 10, as shown in Figure 1, while the rear vehicle wheel is indicated at 11. Then in Figure 5, 12 designates the rear axle housing, and 13 the customary differential. By considering Figure 5, it will be seen that the frame structure embodies a pair of suitably shaped end frames 14 connected together by a tie bar 15. Mounted on the crown portions of the end frames are bearings 16. The tie bar is connected with the axle housing on opposite sides of the differential by hingedly connected links 17 and 18. In considering Figures 2 and 4, and noting the mounting for the opposite end of the frame structure, it will be observed that 19 designates a main mounting shaft fastened in attaching brackets 20 (see Figure 1). The end frames are provided with knuckles rockably mounted on this shaft. The frame is allowed to swing up and down upon this fulcrum arrangement. This movement of the frame is produced by the operating devices detailed particularly in Figures 2 and 3.

In these figures, attention is first invited to a rock shaft 21, mounted for oscillation in suitable bearings in the channel bars of the vehicle chassis (see Figure 6). The left hand end of these rock shafts is also journaled in a supplemental bearing 22, carried by the supporting bracket 23.

The operating lever 24 is fastened thereto between the bearing 22 and the collar 25. The shaft 21 is provided with depending rocker arms 26 with which operating devices are adjustably connected. One of these devices is shown in Figure 3, wherein it comprises rod sections 27 and 28 connected together through the medium of a turn buckle 29 and connected at their opposite ends with links 17 and 18 and rocker arms 26 respectively. The lever as shown in this figure is provided with a stop 30 which limits the swinging movement in a forward direction. Hence, with this arrangement, it is obvious that movement of the lever serves to either straighten or collapse the linkage structure 17 and 18 to allow the rear end of the frame structure to be raised or lowered, the fulcrum action being on the forward end of the frame structure mounted on the shaft 19 as before stated.

Attention is now invited to Figure 4, wherein it will be observed that 31 designates a shaft which carries the centrally located reel 32, and a pair of friction driving pulleys or wheels 33 on its opposite ends, these being located on the outer sides of the end frames. Thus, when the frame is raised or lowered, this winding reel can be brought into play taking the power from the vehicle wheels 11, after the vehicle is jacked up in an obvious manner. As shown in Figure 7, the wheels 33 are of two-part construction, to facilitate assembly.

Moreover, the reel embodies a tubular hub portion 34, removable end heads 35, and retaining and reinforcing plates 36. These plates are held in place by retaining rods 37.

I now invite attention to the brake structure and operating means therefor. As shown in Figure 1, each brake embodies a brake band 38 adjustably fastened to a bracket 39 carried by the end frame. The brake band cooperates with a suitable guard and adjusting device 40, supported from the frame structure and suitably braced. The forward end of the band is adjustably connected with a bell crank 41, (see Figure 1) which is mounted on a shaft 42, supported in bearings 43, and the end frames as shown in Figure 4. The bell crank is operated by an adjustable rod 44, which in turn is connected with and operated by a lever 45, mounted on the aforesaid bracket 23. It is obvious, however, that the braking means may be of any appropriate construction to permit the structure to be suitably controlled.

In practice, it is obvious that the cable is wound upon the reel by rotary motion imparted to the reel, through the medium of the end pulleys, and in frictional driving contact with the vehicle wheels after the vehicle has been jacked up.

It is thought that by considering the description in connection with the drawings, a clear understanding of the construction and operation of the invention will be had.

Therefore, a more lengthy description is regarded unnecessary.

Minor changes in the shape, size and rearrangement of details coming within the field of invention claimed may be resorted to, in practice, if desired.

I claim:

1. In a structure of the class described, in combination, a vehicle supporting frame, a driving wheel and axle structure associated with said frame, brackets on said vehicle frame, a shaft mounted in said bracket and spaced forwardly from the vehicle wheels, a reel frame structure rockably mounted on the shaft, at its forward end, linkage connections between the rear end of said frame structure and said vehicle axle, manually operated actuating means for the linkage, and a reel structure mounted on the reel frame and including driving pulleys for cooperation with the vehicle wheel.

2. In a structure of the class described, in combination, a vehicle supporting frame, driving wheel and axle structure associated with said frame, brackets on said vehicle frame, a shaft mounted in said bracket and spaced forwardly from the vehicle wheels, a reel frame structure rockably mounted on the shaft at its forward end, linkage connections between the rear end of said frame structure and said vehicle axle, manually operated actuating means for the linkage, and a reel structure mounted on the reel frame and including driving pulleys for cooperation with the vehicle wheel, and said reel frame structure embodying a pair of end frames, a tie bar between said frames, and bearings, said rotary reel including an axle journaled for rotation in said bearing.

3. In a structure of the class described, a vehicle frame, a vehicle axle structure, a relatively stationary shaft carried by the vehicle frame, a rock shaft mounted on the vehicle frame, a reel supporting frame, rockably mounted on said first named shaft at its forward end, linkage connections between the rear end of said frame and said axle structure, operating connections for the linkage between said linkage and rock shaft, an operating lever for said rock shaft, and reel supporting bearings on said reel frame, a rotary reel structure associated with the reel frame, and embodying a shaft journaled in said bearings, a centrally located reel, and friction driving pulleys.

4. In a structure of the class described, a vehicle frame, a vehicle axle structure, a relatively stationary shaft carried by the vehicle frame, a rock shaft mounted on the vehicle frame, a reel supporting frame, rockably mounted on said first named shaft at its forward end, linkage connections between the rear end of said frame and said axle structure, operating connections for the linkage between said linkage and rock shaft, an operating lever for said rock shaft, and reel supporting bearings on said reel frame, a rotary reel structure associated with the reel frame, and embodying a shaft journaled in said bearings, a centrally located reel, friction driving pulleys, and braking means on the end portions of the pulley, and operating means for the braking means including a lever mounted on said vehicle frame.

In testimony whereof I affix my signature.

CHARLES CLIFFORD CROCKETT.